3,329,818
PHOTOELECTRIC TRACKING SYSTEM COMPRISING A PLURALITY OF TELESCOPES VIEWING ADJACENT FIELDS
Walter E. Woehl, Alamogordo, N. Mex., assignor to the United States of America as represented by the Secretary of the Air Force
Filed Mar. 8, 1963, Ser. No. 264,002
7 Claims. (Cl. 250—203)

The invention described herein may be manufactured and used by or for the United States Government for governmental purposes without payment to me of any royalty thereon.

This invention relates to a system for the surveillance and tracking of satellites and space vehicles and is more particularly concerned with providing a photo-optical camera system which utilizes compound telescopic optics of single optical facets in combination with image orthicon cameras as sensor elements and associated electronic circuitry for image enhancement and digital image coordinate read-out in real-time.

Presently known photo-optical camera systems for searching, acquiring and tracking distant objects such as orbiting satellites and space vehicles, generally utilize large aperture optical systems combined with special tracking apparatus as required under the particular conditions present. These systems are restricted to night time and twilight operation when the sky is dark. Also, the available photo-optical systems include long focal length telescopes combined with photoelectric cameras which have a relatively small field of view and low target acquisition probability. None of the above-mentioned designs has real-time image coordinate read-out capabilities associated therewith.

For the purpose of tracking and surveillance of satellites and space vehicles, particularly at great distances, photo-optical cameras are required which have the following performance parameters: high photometric sensitivity; high angular resolution and accuracy; a large field which gives high target acquisition probability; day-time recording capability; automatic image coordinate counting and read-out in real-time acceptable to computer input registers; and accurate outer orientation and inner calibration data.

The invention herein described provides a camera system which meets all of the above-listed requirements. Some of the unique features of the invention include a facet-element, compound optical system, multi-chain synchronized operation, and automatic read-out of image coordinates in real-time. The feature of a facet-element, compound optical system makes it possible to have a comparatively wide field associated with a long focal length. This results in very low distortion and aberration values and makes the daytime recording of space vehicles feasible. The wide field and long focal length make it possible to achieve the accuracy of a ballistic camera and have a star background sufficient for calibration of the image coordinates. This is not obtainable with the conventional single camera arrangement. Thus, the facet-element compound optical system provides for the extraction of data obtaining high practical value while, at the same time, the target acquisition probability is high enough for practical operational requirements. Again, it is not possible to obtain comparable results with single chain instruments and single optical systems.

The unique feature of a multi-chain synchronized operation has the effect of producing more meaningful results capable of interpretation with a multi-chain synchronized procedure. Its effect is more than just adding fields to the single unit field. Likewise, the feature of automatic image coordinate read-out in real-time, and in digital form, cannot be achieved with conventional photo-optical cameras. When combined with the previously mentioned features, the required operational performance is provided. The structural features of the tracking system and the cooperation of the various elements with one another will be described hereinafter in detail.

It is an object of the present invention to provide a photo-optical system capable of acquiring and tracking satellites and space vehicles located great distances from the tracking station.

Another object of the invention is to provide means for obtaining accurate position versus time information on objects in space.

Still another object of the invention is to provide an arrangement having a comparatively wide field associated with a long focal length while utilizing only paraxial rays.

A further object of the invention is to provide a photo-optical camera system having a multi-chain synchronized operation which produces more meaningful results as well as a higher target acquisition probability.

A still further object of the invention is to provide automatic image coordinate read-out in real-time and in digital form so as to be acceptable to computer input registers.

These and other objects, features and advantages will become more apparent from the following description taken in connection with the accompanying drawings, wherein.

Figure 1:
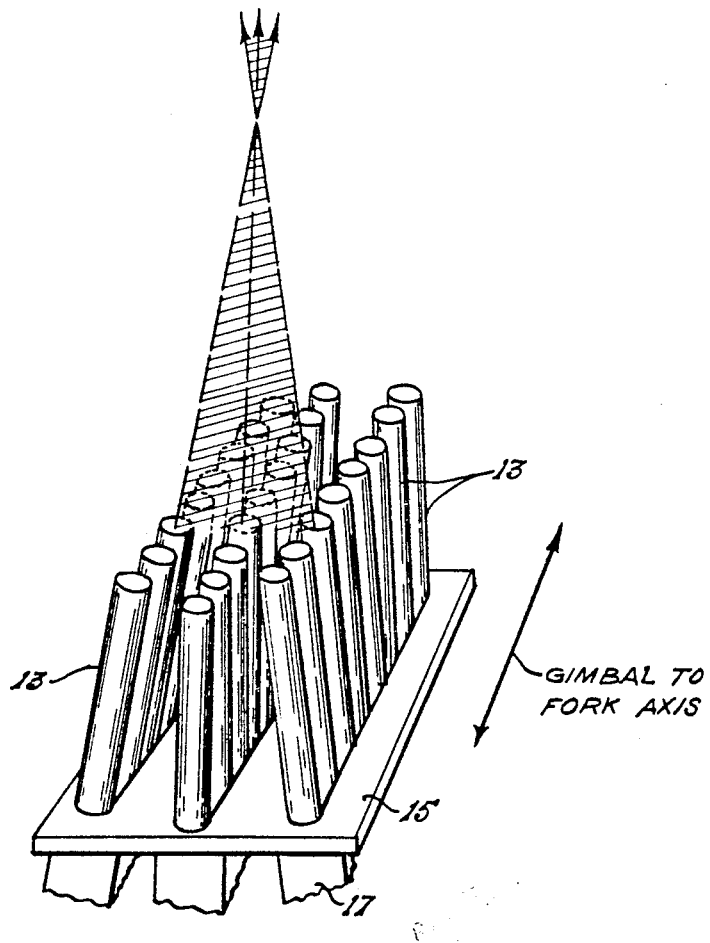
FIGURE 1 shows a three-row fan arrangement of telescopes for covering a certain total field.

Referring now to FIGURE 1, there is shown a three-row fan arrangement of twenty-five refractor telescopes 13 positioned on a mounting plate 15. In a preferred embodiment of my invention, the telescopes 13 have a seventy-five inch focal length and a five inch clear aperture. Image orthicon tubes 17 having a usable sensor area of one and one-tenth inches square are combined with the telescopes 13, thereby covering a square field of fifty-two minutes of arc in the object space. The total field covered by the tracking system having the above specifications is a seven-by-two and one-half degree area.

Figure 2:
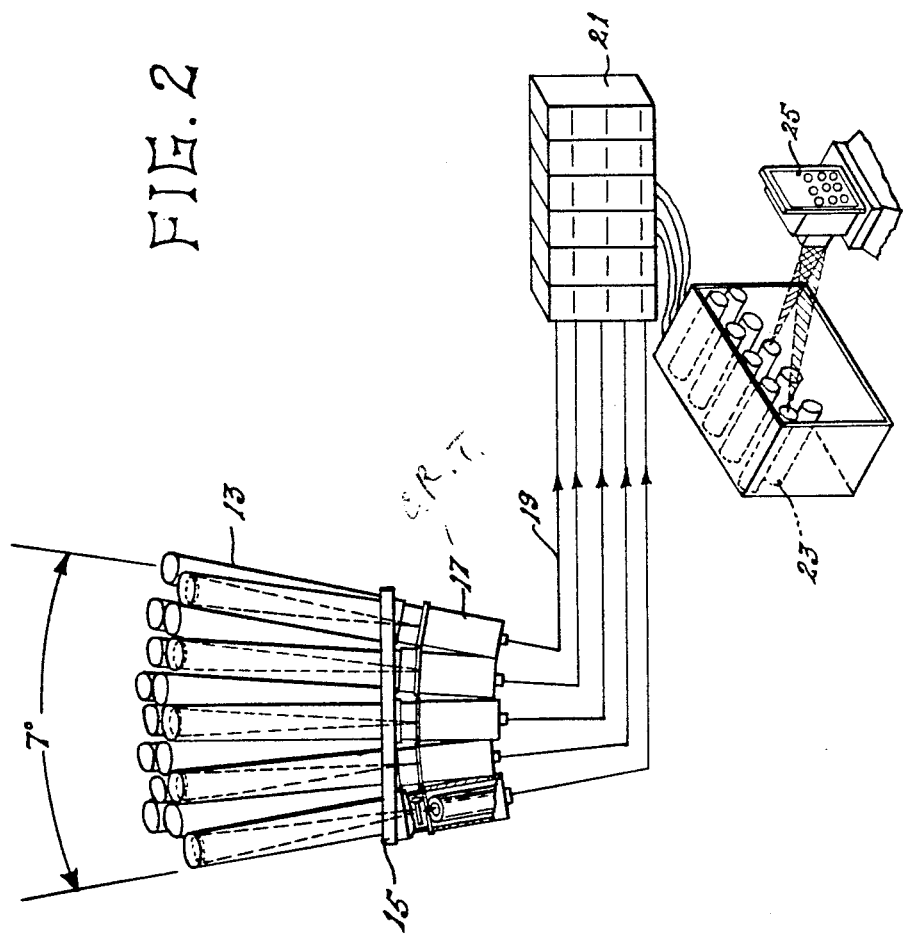
FIGURE 2 is a schematic view of the camera system showing the relationship of its various components.

The twenty-five telescopes 13 form optical images of adjacent segments of the space field on the photosurfaces of a corresponding number of image orthicon tubes 17 as illustrated in FIGURE 2. Also contained in the camera bodies but not shown in the drawing are preamplifiers for the video signals, sweep circuits, sweep failure protection circuits, blanking amplifiers and rectifiers, and associated power circuitry. The video signal is fed through the coaxial cables 19 into the camera control station 21 where the signal complex is treated for improvement of its information content, such as increase in contrast and signal-to-noise ratio, and background suppression. The improved images are then presented for visual inspection on the screens of twenty-five monitor oscilloscope tubes 23 and for photographic recording by the camera 25.

Figure 3:
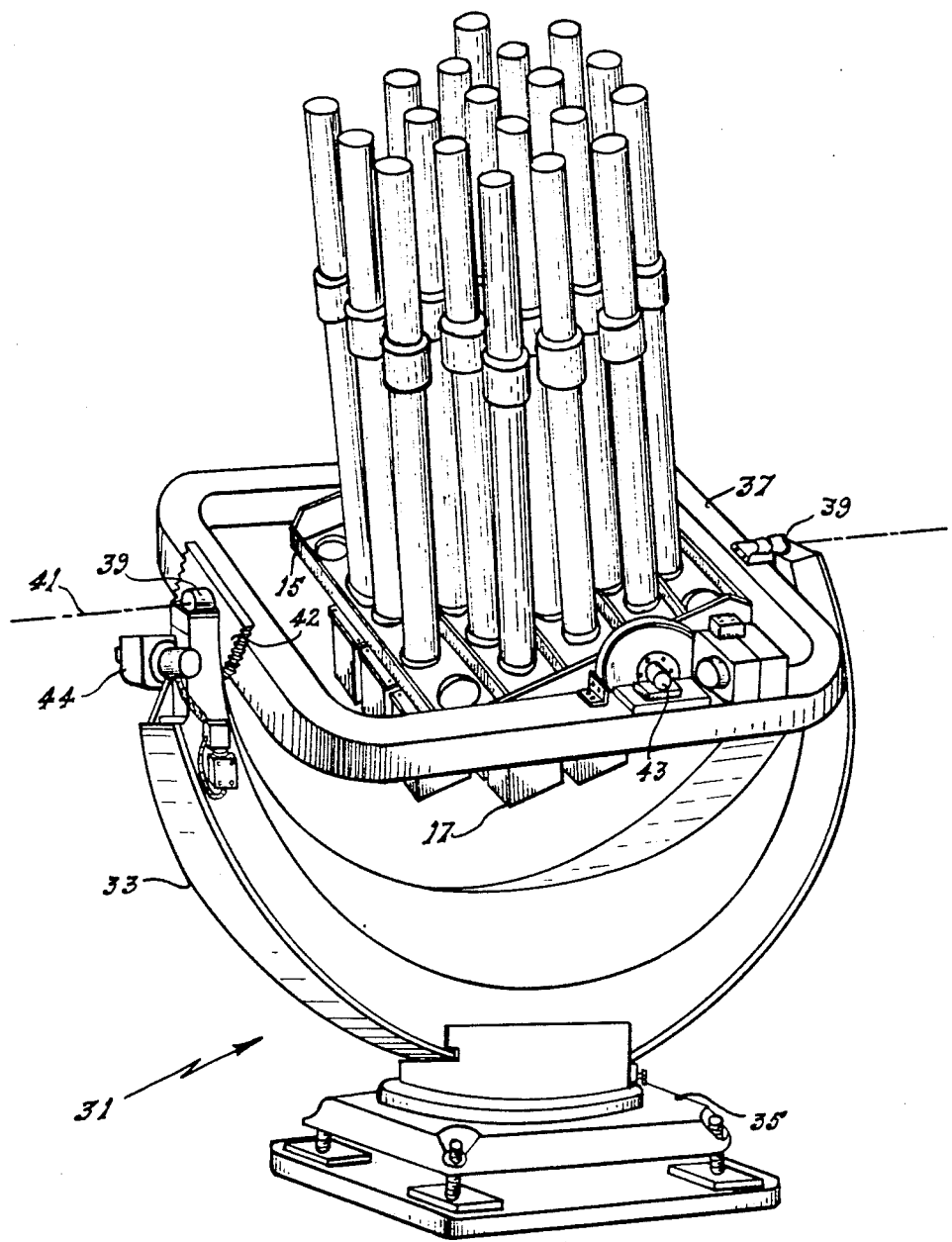
FIGURE 3 shows the arrangement of a five-by-five telescope assembly positioned on a four-axis mount with six of the telescopes removed.

In FIGURE 3 there is shown an embodiment of the invention utilizing twenty-five telescopes 17 in a five-byfive arrangement. Several of the telescopes are not in position on the four-axis mount generally designated by the reference numeral 31. The arc shaped fork 33 moves on steel rollers on top of the base plate 35. A gimbal frame 37 is pivotally mounted on the uppermost portion of the fork 33 and pivots on the shaft 39. When the gimbal-to-fork axis 41 is pointed in the direction of Polaris, an equatorial mount is obtained whereby the rotation of the gimbal 37 represents the sidereal movement required. The mounting plate 15 is attached to the gimbal ring 37 in such a manner as to pivot in the bearing 43.

All four movements of the mount 31 may be motor driven and the gimbal rotation and plate rotation may be provided with variable speed drives having remote speed changers attached. For example, the gimbal frame 37 is rotated about axis 41 by means of a gear sector 42 secured to the frame, and driven by a motor driven pinion gear (not shown) mounted at 44 on the fork 33. Alternatively, a worm and worm wheel arrangement could be utilized. Sectors mounted on the frame 15 and the fork 33 would have separate motor driven means for their operation.

Figure 4:
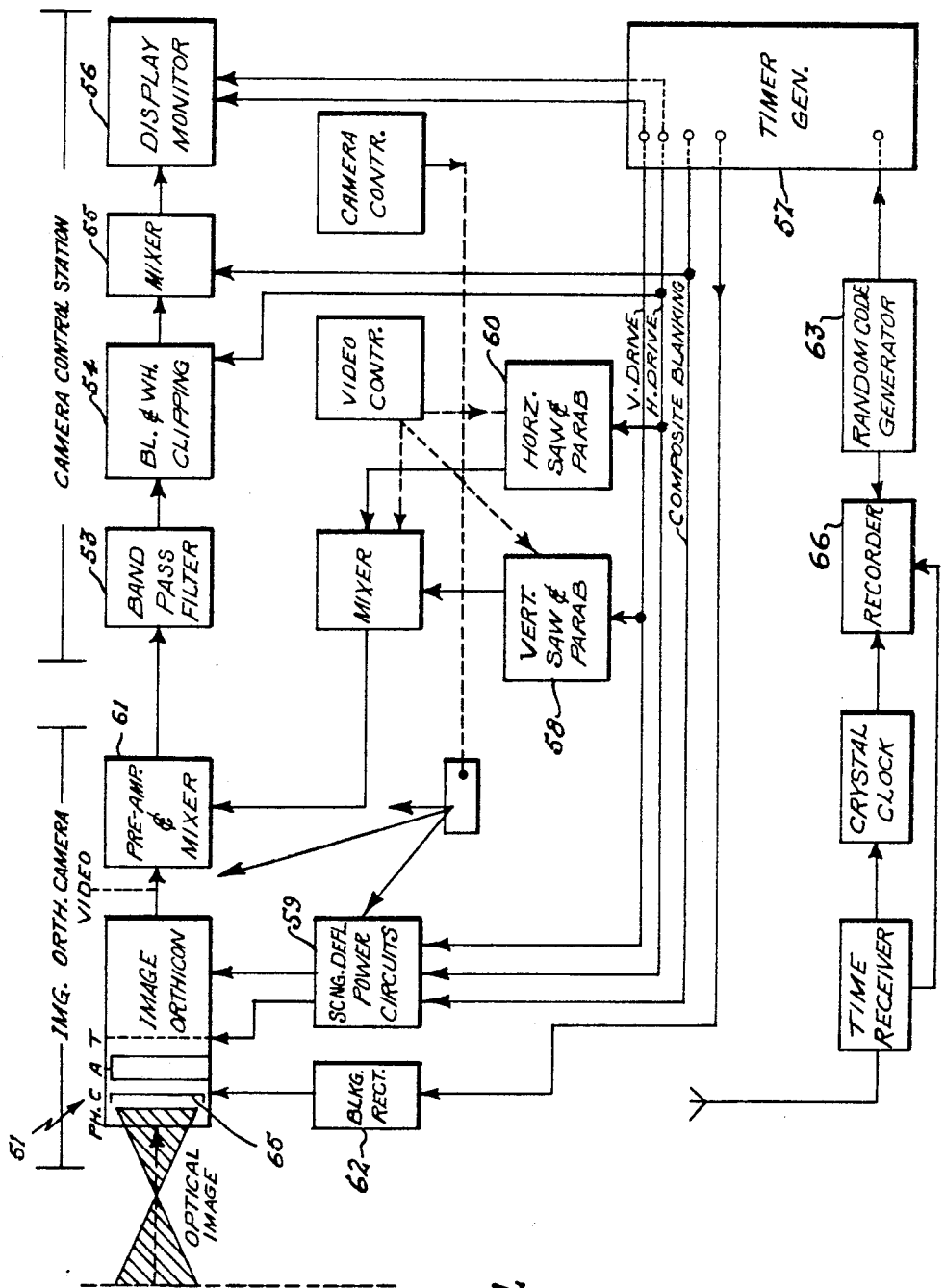
FIGURE 4 is a block diagram illustrating the flow of image information from the camera to the timer generator.

The functional flow chart shown in FIGURE 4 illustrates in block form the logical interconnection of the major electronic components of the tracking system. It can be seen that the tracking system utilizes a conventional television pick-up tube and scanning circuit to detect and present the information contained in the optical telescopic image. An optical image from one of the telescopes 13 is applied to its corresponding image orthicon tube 51, having an output which enters a band filter 53 for reducing the band width of 2.6 mc. to 1.6 and 1.0 mc. A clipping action takes place at the black and white clipping circuit 54. The clipped signal is then applied through a mixer 55 to the display monitor 56.

A timer generator 57 is incorporated into the system for synchronizing all drive pulses as well as the blanking and shading controls, the keyed clamps and the linearity control pattern. The timer generator 57 applies simultaneous signals to the display monitor 56, the vertical saw tooth and parabolic shading generator 58 and the scanning deflection power circuits 59 of the image orthicon 51. Similarly, the display monitor 56 receives a signal from the timer generator 57 simultaneously with the horizontal saw tooth and parabolic shading generator 60 and the scanning deflection power circuits 59. A composite blanking signal is applied to the scanning deflection power circuits 59 and the mixer 55 immediately prior to the display monitor 56. The timer 57, in addition to its other functions, also controls the blanking rectifier 62 connected to the photocathode 65 of the image orthicon tube 51 and operates to line synchronize the clamping and shading opertaions. Thus, the camera video and camera control stations are synchronized by means of the timer generator 57 such that each telescope and its associated circuit presents an image of its field of view at the proper time resulting in a display in which all of the telescopes present a composite picture of the space field of view covered.

The random code generator 63 supplies code pulses to the photocathode 65 of the image orthicon tube interrupting the flow of photoelectrons from the photosurface to the target plate. In this way, breaks in the event trace are introduced which are recorded together with time pulses received from United States Government operated radio station WWV or pulses from a local high stability frequency standard in a separate time recorder 66. The time breaks can also be effected by an external source or manually operated.

Figure 5:
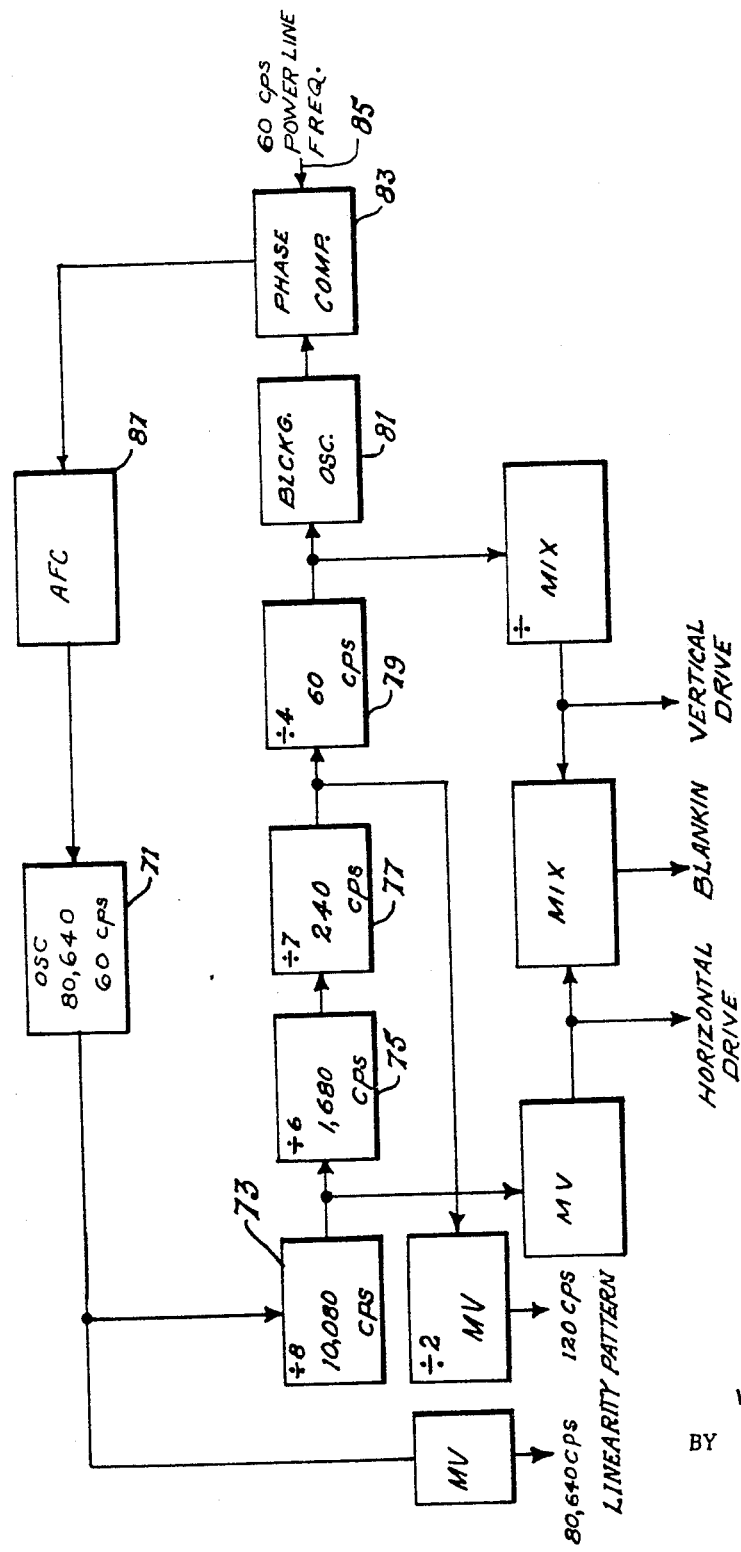
FIGURE 5 is a detailed functional diagram of the timer generator showing the means for synchronizing the command pulses for the simultaneous operation of the 25 camera chains.

A detailed functional diagram of the timer generator 51 is shown in FIGURE 5. The timer generator 51 may be considered the center command device of the system and operates to synchronize all command pulses needed for the simultaneous operation of the twenty-five camera chains.

The basic oscillator 71 operates at 80,640 cycles per second. This frequency is successively divided in the phantastron counter steps 73, 75, 77 and 79 down to 60 cycles per second. The 60 cycle output synchronizes a blocking oscillator 81 which drives a phase comparator 83 which compares the phase of the blocking oscillator 81 with the 60 cycle power line 85. The error signal is used to drive an automatic frequency control circuit 87. This component sets the frequency of 80,640 cycle oscillator 71 to an integral multiple of the power line frequency.

The derived timing signal are 10,080 cycles per second for the horizontal sweep and 15 cycles per second for the vertical sweep. The frame rate of the system is 15 frames per second—672 lines non-interlaced operation. In order to produce a cross hatch pattern consisting of dark bars, a composite blanking of the horizontal and vertical sweeps and 80,640 cycle and 120 cycle for a composite linearity blanking pattern are utilized.

The choice of compound optical system required to obtain the desired performance is not limited to the facet arrangement as described. The number of facet-elements and the inclination of their optical axes with respect to each other can be varied. If it should be desired to reduce the weight of the total telescope assembly, the separate telescope tubes may be eliminated by mounting the individual lens cells on a facet envelope or hull. Another possible design is to employ telescopes of larger aperture and longer focal length resulting in an optical system requiring a larger mount structure.

Although the invention has been described with reference to particular embodiments, it will be understood to those skilled in the art that various changes and modification can be made therein without departing from the invention. For example, although the embodiment herein described uilizes image orthicon tube means at the eyepiece of each telescope to detect the optical image contained thereon, the image could also be detected and recorded by conventional photographic camera means mounted at each telescope eyepice. Therefore, it is intended that all matter contained in the above description or shown in the accompanying drawings shall be interpreted in the illustrative sense and it is aimed in the appended claims to cover all such changes and modifications without departing from the true spirit and scope of the invention.

What is claimed is:

1. A photoelectric tracking system for acquiring and tracking a moving object in space comprising a plurality of telescopes angularly inclined at varying optical axes with respect to each other, said telescopes being fixedly positioned to observe adjacent segments of a space field and produce optical images thereof, separate image orthicon means disposed at the eyepiece end of each of said telescopes for converting said optical images into corresponding electron images, preamplifier and mixer means for enhancing the information content of the converted image, band pass filter means for reducing the band width of the image containing signal, black and white clipping means applied to the signal, composite shading generating means supplied through horizontal and vertical sweep drives to the preamplifier means in said image orthicon means, cathode-ray oscilloscopes for receiving and displaying the enhanced electron images from each of said image orthicon means, camera means for photographically recording the displayed images, and a timer generator for synchronizing the command pulses to simultaneously operate the image recording camera means.

2. The tracking system defined in claim 1 wherein the image orthicon means for converting the optical image produced by said telescopes into a corresponding electron image includes photosensitive cathode element, a target structure, and means for scanning the target structure to detect information contained thereon.

3. In combination, a plurality of telescopes angularly inclined at varying optical axes with respect to each other, said telescopes being fixedly positioned to observe adjacent segments of a space field and produce optical images thereof, and sensing means for automatic image coordinate read-out in real-time and in digital metric form acceptable to computer input registers, said sensing means comprising a corresponding plurality of image orthicon tubes disposed at the eyepiece of each of said telescopes for converting said optical images into corresponding electron images, control means for improving the information content contained in the output of said image orthicon tubes, a plurality of cathode-ray oscilloscopes arranged to receive and display the improved signals from said control means and means for recording and interpreting the information received by said oscilloscopes.

4. The combination defined in claim 3 wherein the control means for improving the information content of the eelctron image includes a timer generator for synchronizing the operation of the plurality of telescopes.

5. In combination, a plurality of telescopes angularly inclined at varying optical axes with respect to each other, said telescopes being fixedly positioned to observe adjacent segments of a space field and producing optical images of each of said segments, a mounting plate for retaining said telescopes in predetermined angular spaced relationship to each other, an image orthicon camera positioned at the eyepiece end of each of said telescopes for converting said optical images into corresponding electron images, control means for receiving and improving the information content of said electron images, a plurality of cathode-ray oscilloscopes arranged to receive and display the improved signal from said control means, and computer means for receiving and electronically analyzing the electron images produced by the image orthicon cameras.

6. The combination defined in claim 5 wherein a four-axis mount is provided for universally varying the direction of sight of the telescopes as a group, said mount comprising, a base plate, an arc shaped fork disposed on said base plate for rotation around an axis vertical thereto, means for rotating said fork around an axis perpendicular to said vertical axis, and a gimbal frame pivotally mounted on the uppermost portion of said fork, said mounting plate being pivotally mounted on said gimbal frame.

7. A photoelectric tracking system for acquiring and tracking a moving object in space comprising a plurality of telescope objective lenses mounted in fixed spaced relation to one another, a plurality of eyepiece elements in optical alignment with corresponding objective lenses, the optical axes of said objective lenses and associated eyepiece elements being inclined at varying angles with respect to each other for observing adjacent segments of a space field and producing optical images thereof, means disposed at each of said eyepiece elements for converting said optical images into corresponding electron images, means for enhancing the information content of the converted image, a corresponding plurality of cathode-ray oscilloscopes for receiving and displaying said enhanced electron images, and camera means for photographically recording the displayed images.

References Cited

UNITED STATES PATENTS

| | | | |
|---|---|---|---|
| 2,398,642 | 4/1946 | Homrighous | 250—227 X |
| 2,506,672 | 5/1950 | Kell et al. | 250—227 X |
| 3,001,289 | 9/1961 | Carbonara | 250—203 X |
| 3,010,024 | 11/1961 | Barnett et al. | 250—203 |
| 3,185,852 | 5/1965 | Lewis | 250—203 X |
| 3,187,339 | 6/1965 | Clay | 88—1 |
| 3,231,743 | 1/1966 | Potvin | 250—203 |
| 3,238,294 | 3/1966 | Krauss | 88—1 |

FOREIGN PATENTS 285,738  2/1928  Great Britain.

RALPH G. NILSON, *Primary Examiner.*

E. STRICKLAND, M. A. LEAVITT,
*Assistant Examiners.*